(12) United States Patent
Bhatt et al.

(10) Patent No.: US 6,937,570 B2
(45) Date of Patent: Aug. 30, 2005

(54) RESOURCE AWARE SESSION ADAPTATION SYSTEM AND METHOD FOR ENHANCING NETWORK THROUGHPUT

(75) Inventors: Yogesh Bhatt, Richardson, TX (US); Jue Chang, Plano, TX (US); Vyankatesh Shanbhag, Plano, TX (US)

(73) Assignee: Tektronix, Inc., Beaverton, OR (US)

( * ) Notice: Subject to any disclaimer, the term of this patent is extended or adjusted under 35 U.S.C. 154(b) by 0 days.

(21) Appl. No.: 10/289,608

(22) Filed: Nov. 7, 2002

(65) Prior Publication Data

US 2003/0086407 A1 May 8, 2003

Related U.S. Application Data

(60) Provisional application No. 60/348,450, filed on Nov. 7, 2001.

(51) Int. Cl.[7] .......................... G01R 31/08; G06F 11/00; G08C 15/00; H04J 1/16; H04J 3/14; H04J 3/16; H04J 3/22; H04L 1/00; H04L 12/26
(52) U.S. Cl. ........................................ 370/242; 370/465
(58) Field of Search ................................. 370/241, 242, 370/248, 252, 229, 235, 236, 464, 465, 468, 527

(56) References Cited

U.S. PATENT DOCUMENTS

| | | |
|---|---|---|
| 4,430,701 A | 2/1984 | Christian et al. |
| 5,197,002 A | 3/1993 | Spencer |
| 5,287,499 A | 2/1994 | Nemes |
| 5,566,171 A | 10/1996 | Levinson |
| 5,566,297 A | 10/1996 | Devarakonda et al. |
| 5,594,863 A | 1/1997 | Stiles |
| 5,623,601 A | 4/1997 | Vu |
| 5,708,655 A | 1/1998 | Toth et al. |
| 5,758,088 A | 5/1998 | Brezaire et al. |
| 5,761,405 A | 6/1998 | Tadamura et al. |
| 5,799,154 A | 8/1998 | Kuriyan |
| 5,841,764 A | 11/1998 | Roderique et al. |
| 5,896,496 A | 4/1999 | Suzuki |
| 5,987,320 A | 11/1999 | Bobick |
| 6,018,805 A | 1/2000 | Ma et al. |
| 6,044,272 A | 3/2000 | Kobylinski et al. |
| 6,070,190 A | 5/2000 | Reps et al. |
| 6,085,105 A | 7/2000 | Becher |
| 6,144,849 A | 11/2000 | Nodoushani et al. |
| 6,148,177 A | 11/2000 | Faris et al. |

(Continued)

FOREIGN PATENT DOCUMENTS

| | | |
|---|---|---|
| EP | 1061699 | 12/2000 |
| WO | 99/16266 | 4/1999 |
| WO | 00/18154 | 3/2000 |
| WO | 00/21231 | 4/2000 |

OTHER PUBLICATIONS

Improving TCP/IP Performance over Wireless Networks—Hari Balakrishnan, et al. In Proc. 1st ACM Int'l Conf. Mobile Computing and Networking (MobiCom) Nov. 1995.
Layer 4+ Switching With QOS Support for RTP and HTTP; Till Harbaum, et al.; Global Telecommunications Conference—Globecom '99.
TCP for Wireless and Mobile Hosts (MobiCom '99 Tutorial); Nitin H. Vaidya, Texas A&M University.

*Primary Examiner*—Seema S. Rao
*Assistant Examiner*—Kevin C. Harper

(57) ABSTRACT

A system, method, and apparatus for maintaining the status of communications between a wireless client and a content source is presented herein. During periods where the wireless link at the wireless client has deteriorated, a wireless content switch prevents timers at the content source from expiring by transmitting an acknowledgment message to the content source. The acknowledgement also stops the content source from transmitting data packets to the wireless client by indicating a zero window size. Additionally, during the time period that the wireless link to the wireless client is deteriorated, the wireless content switch responds to communications from the content source for the wireless client.

13 Claims, 4 Drawing Sheets

U.S. PATENT DOCUMENTS

| | | | |
|---|---|---|---|
| 6,173,384 B1 | 1/2001 | Weaver | |
| 6,178,331 B1 | 1/2001 | Holmes et al. | |
| 6,201,962 B1 | 3/2001 | Sturniolo et al. | |
| 6,208,620 B1 * | 3/2001 | Sen et al. | 370/231 |
| 6,212,175 B1 * | 4/2001 | Harsch | 370/338 |
| 6,215,994 B1 | 4/2001 | Schmidt et al. | |
| 6,226,267 B1 | 5/2001 | Spinney et al. | |
| 6,230,165 B1 | 5/2001 | Cook, III | |
| 6,272,148 B1 * | 8/2001 | Takagi et al. | 370/469 |
| 6,463,055 B1 * | 10/2002 | Lupien et al. | 370/353 |
| 2001/0028636 A1 | 10/2001 | Skog et al. | |
| 2001/0037358 A1 | 11/2001 | Clubb et al. | |
| 2001/0049731 A1 * | 12/2001 | Kuusinen et al. | 709/223 |
| 2002/0009986 A1 | 1/2002 | Bern et al. | |
| 2002/0089930 A1 * | 7/2002 | Aceves et al. | 370/230 |
| 2002/0090003 A1 * | 7/2002 | Melpignano et al. | 370/467 |
| 2002/0106991 A1 * | 8/2002 | Foore et al. | 455/70 |
| 2002/0118663 A1 | 8/2002 | Dorensbosch et al. | |
| 2002/0122385 A1 * | 9/2002 | Banerjee | 370/229 |
| 2003/0031161 A1 * | 2/2003 | Froehlich et al. | 370/349 |

* cited by examiner

RESOURCE AWARE SESSION ADAPTATION SYSTEM AND METHOD FOR ENHANCING NETWORK THROUGHPUT

CROSS-REFERENCE TO RELATED APPLICATIONS

This application claims the priority benefit of U.S. Provisional Application for Patent, Ser. No. 60/348,450, entitled "A Resource Aware Session Adaptation System And Method For Enhancing Network Throughput For Packet Data Communication With Wireless Links During Deterioration And Intermittent Handoffs," filed on Nov. 7, 2001 which is hereby incorporated by reference for all purposes.

STATEMENT REGARDING FEDERALLY SPONSORED RESEARCH/DEVELOPMENT

Not Applicable.

FIELD

The present application is related to wireless packet data networks, and more particularly to averting transmission control protocol congestion control mechanisms.

BACKGROUND

Wireless networks which were originally designed for wireless telephone services are being adapted for wireless data services as well. The wireless networks are adapted for wireless data services by linking the wireless network to the preexisting wired data network. Wireless packet data protocols such as General Packet Radio Service (GPRS) and EDGE were developed to facilitate the transmission of data packets over the wireless network.

The most common wired data network is the Internet. Data is transmitted over the Internet using data packets. The data packets are sent from a sender to a recipient over a number of network connections between the sender and recipient. Unlike a switched network, no dedicated connection between the sender and recipient is established. In contrast, the packets are sent from the sender with an address associated with the recipient, such as an Internet Protocol address (IP address) over any one of a number of available paths which are formed between the sender and recipient over the internet.

Due to the lack of a dedicated path between the recipient and the sender, the requisite time of transmission can vary from packet to packet. Additionally, during periods of high congestion, data packets can also be lost. The foregoing considerations necessitate a means of providing the sender with a confirmation that the transmitted data packets are received. The Transmission Control Protocol (TCP) provides for the user of acknowledgement messages between the recipient and the sender, responsive to receipt of a data packet.

TCP initially causes the transmission rate to ramp-up in a sliding window at the beginning of a packet flow, which includes the slow-start mode and the congestion avoidance mode. The rate is continuously increased until there is a loss or time-out of the packet receipt acknowledgement message. TCP then "backs off", decreasing the transmission window size, and then retransmits the lost packets in the proper order at a significantly lower rate. TCP will then slowly increase the transmission rate in a linear fashion, which is called the congestion-avoidance mode. TCP assumes that packet losses are due to congestion and implements "congestion avoidance" at the source of the information.

As noted above, TCP assumes that lost packets are due to network congestion. In wired networks, which are characterized by low bit error rates, the assumption is accurate. However, wireless networks are characterized by comparatively higher bit error rates, limited bandwidth, radio interference, and intermittent hand-offs cause more packet losses. The assumption that all packet losses are due to congestion becomes inaccurate.

In the presence of the high bit error rates and intermittent connectivity characteristic of wireless links, TCP reacts to packet losses in the same manner as in the wired environment. The transmission window size is lowered before retransmitting packets and congestion control and avoidance mechanisms are invoked. The foregoing measures result in an unnecessary reduction in the wireless link's bandwidth utilization, thereby causing a significant degradation in performance in the form of poor throughput and very high interactive delays.

Additionally, modifications to the TCP protocol are often unfeasible because of the necessary changes that would have to be made to the preexisting wired network.

Accordingly, it would be desirable to alleviate the bandwidth utilization performance degradation brought on by TCP congestion control and avoidance mechanisms in response to lost data packets over wireless links in a seamless manner with minimal modifications to the preexisting infrastructure.

SUMMARY

The present application provides for a resource aware session adaptation system and method for enhancing network throughput for packet data communication with wireless links during deterioration and intermittent handoffs. A wireless content switch detects deterioration of the wireless link and responsive thereto, transmits signals to the content source which prevent a timer at the content source from expiring. Additionally, the wireless context switch can also temporarily stop the content source from transmitting additional packets to the wireless client, and respond to communications from the content source for the wireless client during the time period that the wireless link has deteriorated.

DETAILED DESCRIPTION OF THE DRAWINGS

Figure 1:
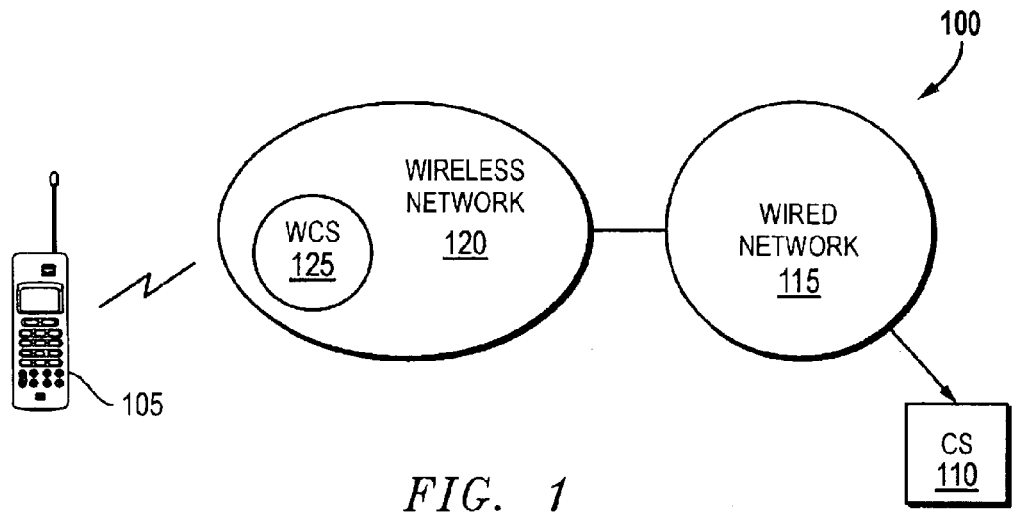
FIG. 1 is a block diagram of an exemplary data network.

In the descriptions which follow, like parts are marked throughout the specification and drawings with the same numerals, respectively. The drawing figures are not necessarily drawn to scale and certain figures may be shown in exaggerated or generalized form in the interest of clarity and conciseness.

Referring now to FIG. 1, there is illustrated a block diagram of a communication network, referenced generally by the numeric designation 100, for transmitting data to a wireless client 105 from a content source 100. The wireless client 105 is a mobile terminal generally associated with the user or subscriber to the wireless network 120, and can comprises, but is not limited to, a mobile station, a personal digital assistant, a lap top computer, or a palm top computer capable of engaging in wireless data communications.

The content source 110 is a server computer which can include, for example, a web server. The content source 110 is generally connected to a wired network 115. The wired network 115 can comprise, for example, a local area network, a wide area network, or the Internet.

The wired network 115 is interfaced with a wireless network 120 associated with the wireless client 105. The wireless network 120 is often a cellular telephone network which is adapted to provide packet data services, such as the Global system for Mobile Telecommunications (GSM). The wireless network 120 communicates with the wireless client 105 over the wireless are interface.

The content source 110 transmits data to the wireless client 105 through a series of data packets. The data packets are transmitted over the wired network 115 to the wireless network 120. The wireless network 120 then transmits the data packets to the wireless client 105 over a wireless link over the air interface. Upon receipt of the data packets at the wireless client 105, the wireless client 105 transmits acknowledgements which indicate the last contiguous data packet received.

After transmission of a data packet, the content source 110 awaits an acknowledgement indicating that the packet was received within a certain time period that depends on the estimated round trip of the packets. At the expiration of the time period, the content source 110 determines that the data packet is lost. As noted above, TCP assumes that lost packets are due to network congestion, and invokes congestion control actions. The congestion control actions are actions which significantly reduce the link throughput of the data session.

In the wired network 115, which is characterized by low bit error rates, the assumption is accurate and congestion control effectively prevents the Internet from a congestion deadlock. However, the air interface between the wireless client 105 and the wireless network 120 is characterized by comparatively higher bit error rates, limited bandwidth, radio inference, regions of poor radio communications (known as "dead zones"), and intermittent hand-offs due to mobility. The higher bit error rates, radio interference, and intermittent hand-offs are major causes for packet losses. The assumption that packet losses are due to congestion becomes inaccurate.

During periods of time where radio link has deteriorated, a wireless content switch 125 which is included in the wireless network 120 prevents the content source 110 from invoking congestion control procedures. The content source 110 invokes congestion control procedures upon expiration of a certain period of time which is known as a retransmission time out (RTO). The period of time is based on the round trip time (RTT) and is tracked by a timer at the content source 110. The wireless content switch 125 prevents the timer at the content source 110 from expiring.

Figure 2:
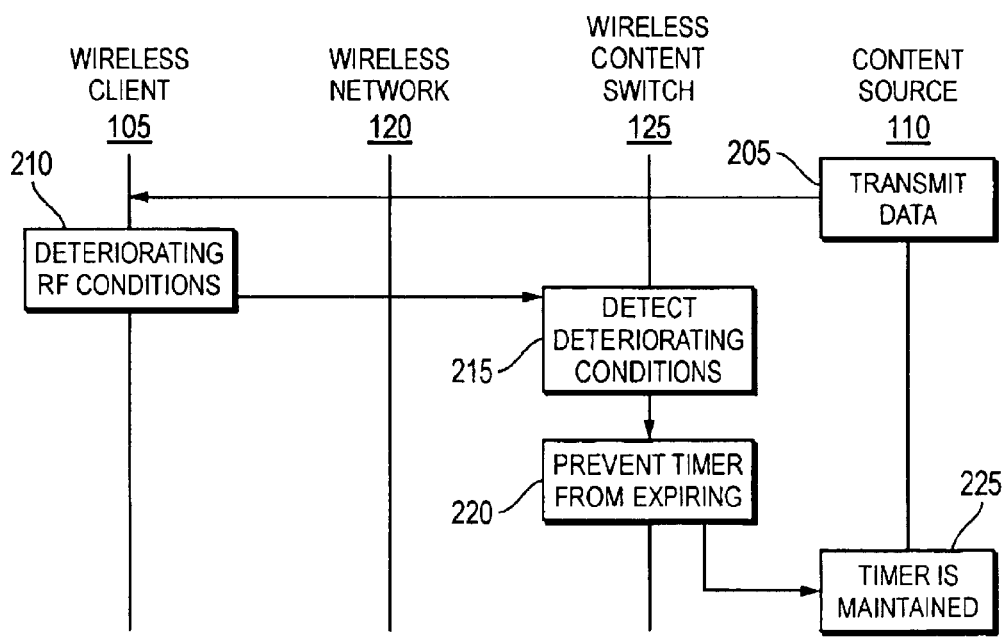
FIG. 2 is a flow diagram describing the operation of the data network.

Referring now to FIG. 2, there is illustrated a signal flow diagram describing the operation of the communication network. The content source 110 transmits data to the wireless client 105 (action 205). Responsive to deterioration of the wireless link (210) to wireless client 105, the wireless content switch 125 detects the foregoing (action 215) and prevents the timer at the content source 110 from expiring.

In the foregoing manner, the communications between the content source 110 and the wireless client 105 can be prevented from deteriorating during periods that the wireless link quality is poor. The content source 110 is prevented from invoking congestion control mechanisms, thereby maintaining the throughput of the communication system 100. Therefore, when the wireless link at the wireless client 105 improves, the content source 110 can continue to transmit the data packets to the wireless client 105 without having to progressively increase the transmission speed.

Figure 3:
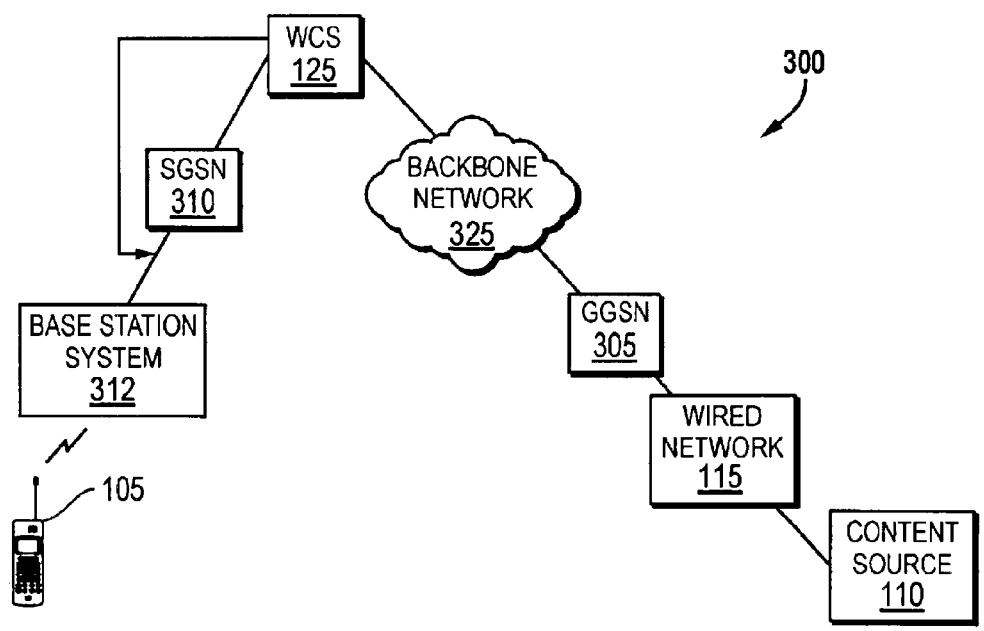
FIG. 3 is a block diagram describing an exemplary packet data network.

Referring now to FIG. 3, there is illustrated a block diagram of an exemplary communication network, referenced generally by the numeric designation 300, in accordance with Global System for Mobile Communications (GSM) specifications with GPRS functionality. It is noted that certain elements have been omitted for the purposes of simplicity and therefore, the FIGURE is not intended as an exhaustive illustration. Pursuant to GSM and GPRS specifications, the wireless network 120 is interfaced with the wired network 115 by any number of Gateway GPRS Support Nodes (GGSN) 305. Each GGSN 305 is associated with any number of IP addresses which the GGSN 305, in turn allocates to the wireless clients 105, either statistically, or dynamically.

The wireless network 120 provides data services to geographical areas which are divided into routing areas. Each routing area is associated with a particular Serving GPRS Support Node (SGSN) 310. Each SGSN 310 is associated with any number of basic station systems 312. The base stations systems 312 include the radio transceiver equipment which transmits and receives signals to and from the wireless client 105. Base station systems 312 maintain radio frequency communications within a geographical area known as a cell.

The SGSNs 310 and the GGSNs 305 are interconnected by a backbone network 325. The backbone network is a network which may form a portion of the wired network 115 and which routes packet data between the SGSNs 310 and the GGSNs 305. During transmission from the content server 110 to the wireless client 105, the content server 110 transmits the data packets to an IP address associated with the GGSN 305. The GGSN 305 receives the data packet, determines the identity and location of the wireless client 105 associated with the IP address. After determining the location of the wireless client 105, the GGSN 305 determines the SSGN 310 associated with the cell containing the wireless client 105 and forwards the packets to the wireless client 105 over the backbone network 325.

A wireless content switch 125 is associated with each SGSN 310 and is placed between the SGSN 310 and the backbone network 325. Each wireless content switch 125 includes a probe which is connected between the base station system 312 and the SGSN 310. In the foregoing manner, the wireless content switch 125 receives all signals that are transmitted and received at the SGSN 310, associated therewith. The signals include signals which are indicative of the quality of the wireless link, such as the Radio Status Message. Other signals include signals which are indicative of impending inter-base station handoffs (Routing Area Update) and inter-SGSN handoffs (Identity Request). The wireless content switch 125 can detect deterioration in the quality of the wireless link by monitoring the foregoing messages. During periods of time where the radio link has deteriorated, the wireless content switch 125 prevents the content source 110 from invoking congestion control procedures by preventing timers at the content source 110 from expiring. In one exemplary embodiment, the wireless content switch 125 is an Intelligent Packet Control Node (IPCN) developed and manufactured by Cyneta Networks, Inc.

The signals transmitted from the wireless content switch 125 include an acknowledgement of the last data packet received by the wireless client 105. The signal also directs the content source 110 to not transmit additional data packets. During the time period that the wireless link is deteriorated, the wireless content switch 125 responds to communications from the content source 110 to the wireless client 105 until the quality of the wireless link is restored.

Figure 4:
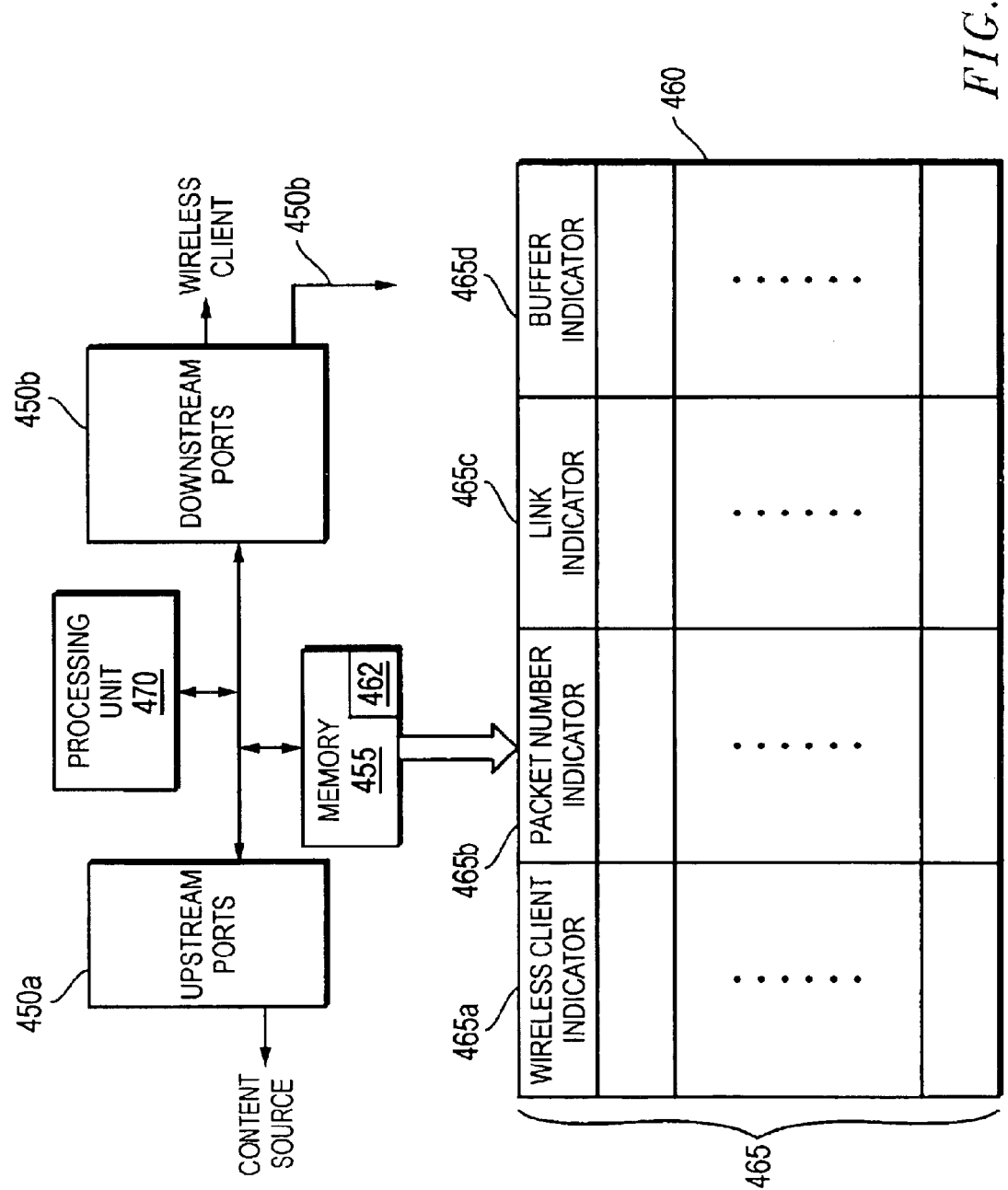
FIG. 4 is a block diagram describing an exemplary wireless content switch.

Referring now to FIG. 4, there is illustrated a block diagram of an exemplary wireless content switch 125. The wireless content switch 125 includes any number of upstream ports 450a and downstream ports 450b. The upstream ports 450a facilitated connection of the wireless content switch 115 towards the content server 110 via a data transport mechanism, such as, for example, a T1, E1, or an Ethernet connection, to name a few. Connection of the wireless content switch 125 towards the content server 110 via the upstream port 450a permits, at the upstream port 450a receipt and transmission of data packets, acknowledgements, and other signals to and from content server 110.

Similarly, the downstream ports 450b facilitate connection of the wireless content switch 125 towards the wireless client 105 via a data transport mechanism. Connection of the wireless content switch 125 towards the wireless client 105 and base station systems 312 via the downstream port 250b permits, and the downstream port, receipt of control signals to and from the wireless client 105. In an exemplary embodiment, the upstream ports 450a can facilitate connection of the wireless content switch 125 to the content source 110 while the downstream ports 450b facilitate the connection to the wireless client 105. Additionally, a particular one of the downstream ports 450b can be used to connect the wireless content switch 125 via a probe to a connection between the basic station system 312 and the SGSN 310. Accordingly, the wireless content switch 125 can receives message transmitted between the base station and the SGSN 310 that carries the wireless link information.

The wireless content switch 125 also includes memory 455 for storage of a wireless client table 460 and a buffer 462. The buffer 462 is used to store data packets transmitted to wireless clients 105 during times that the wireless link conditions for the wireless client 10 have deteriorated. The wireless client table 460 stores any number of records 465, wherein each of the records 465 is associated with a particular wireless client 105. The records 465 include a wireless client indicator 465a, a packet number indicator 465b for the packet number associated with data packets received, a link indicator 465c indicating whether the wireless link is deteriorated, and a buffer indicator 465d which references a particular location of memory 455. The wireless content switch 125 can monitor the acknowledgements transmitted from served wireless client 105, and store the packet number acknowledged in the packet number indicator 465b. During the time periods where the wireless link condition has deteriorated, the link indicator 465c is set to so indicate. Additionally, the buffer indicator 465d is loaded with an address to the buffer 462 wherein the data packets transmitted for wireless client 105 associated with the record 465 are stored. The memory 455 can also stored executable instructions for execution by a processing unit 470. The processing unit 470, memory 455, upstream ports 450a, and downstream ports 450b are interconnected by a bus 475.

The wireless content switch 125 is discussed further in U.S. patent application Ser. No. 09/839,830 entitled "System and Method for Wireless Packet Data Content Switch," which is commonly owned and assigned with the present application and in U.S. patent application Ser. No. 09/884,663 entitled "Packet Retransmission in Wireless Packet Data Networks," which is commonly owned and assigned with the present application and both of which are hereby incorporated by reference.

Figure 5:
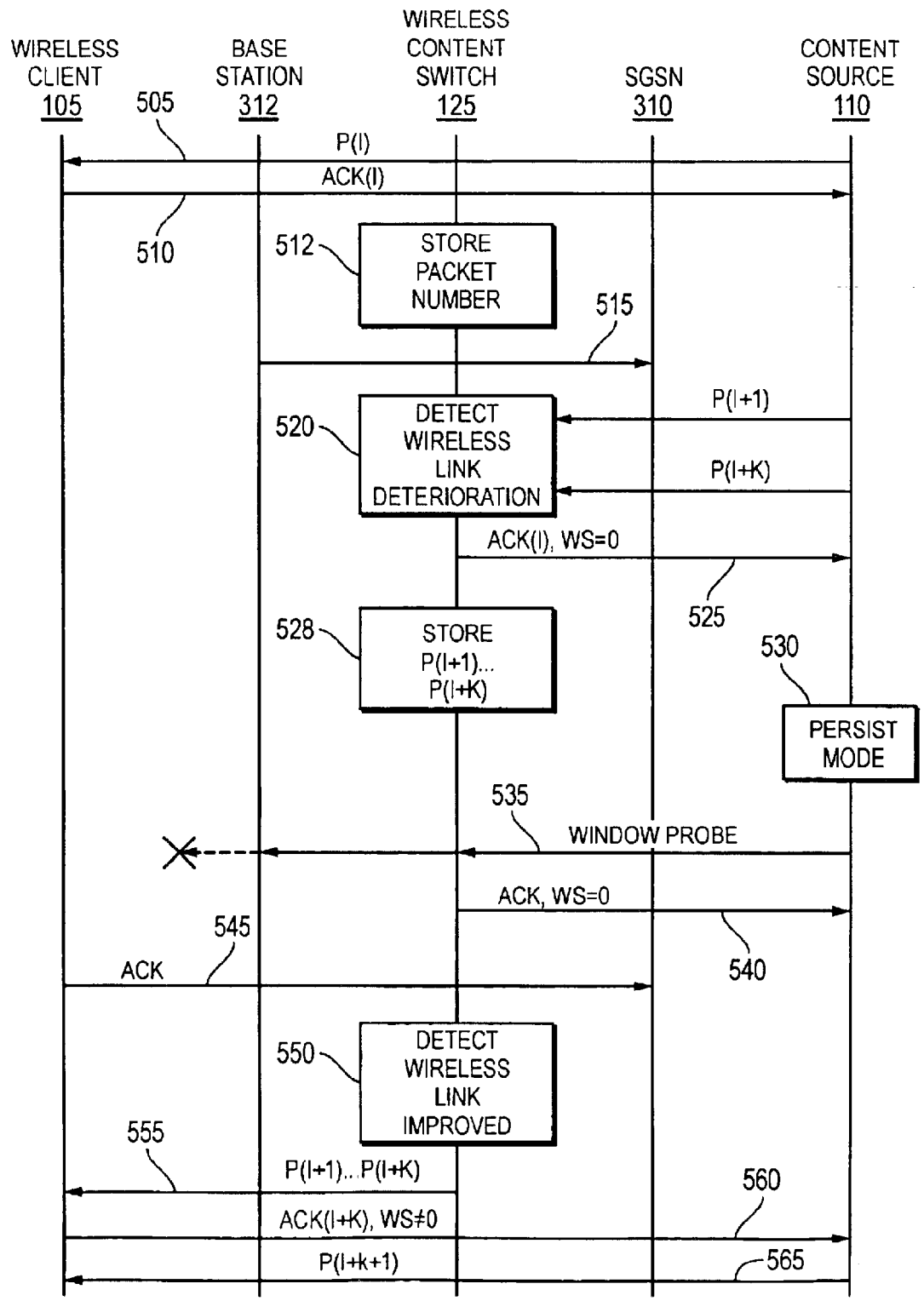
FIG. 5 is a signal flow diagram describing the operation of the packet data network.

Referring now to FIG. 5, there is illustrated signal flow diagram describing the operation of the communication network. The content source 110 transmits data packets (signal 505) to the wireless client 105. Upon receipt of the data packets, the wireless client 105 transmits acknowledgement messages to the content source 110. The acknowledgement messages to the content source 110 indicate the number of the data packet that was received by the wireless client 105 (signal 510). The acknowledgements 510 are received by the wireless content switch 125 via downstream port 450b. The wireless content switch 125 tracks the acknowledgements and stores the packet number in the packet number indicator 465b of the record 465 associated with the wireless client 105 (action 512). Responsive to deterioration in the wireless link, the base station system 312 transmits a signal (signal 515) to the SGSN 310. The foregoing signal can comprise a Radio status Message, wherein a dead zone or radio interference is being encountered. Alternatively, the signal can comprise a Routing Area update, wherein the wireless client 105 undergoes an inter-base station handoff or an Identity Request wherein the wireless client undergoes an Inter-SGSN handoff.

The foregoing signal 515 is also received by the wireless client 105 via the downstream port 450b and probe connected between the base station system 312 and the SGSN 310. The wireless content switch 125 detects (action 520) that the wireless link to the wireless client 105 has deteriorated based on signal 515 and sets the wireless link indicator 465c of record 465 associated with the wireless client 105 to so indicate. Responsive to detection of the deterioration of the wireless link, the wireless content switch 125 transmits an acknowledgement signal via upstream port 450a (signal 525) for the wireless client 105 to the content source 110 for the wireless client 105. The acknowledgement signal acknowledges the data packet that was received by the wireless client 105. The data packet received by wireless client 105 is determined by retrieving the packet number 465b associated with the wireless client 105.

Additionally, the acknowledgement signal 525 causes the content source 110 to temporarily discontinue transmitting data packets to the wireless client 105. Pursuant to the TCP protocol, the acknowledgement signal includes a parameter wherein the recipient of a data packet can indicate that data rate at which it can receive data packets on a dynamic basis. The wireless content switch 125 causes the content source 110 to temporarily discontinue transmitting data packets to the wireless client 105 by setting the receiving window size parameter to indicate a zero value. It is noted that data packets may be transmitted in the time period between the deterioration of the wireless link and the acknowledgement signal 525. The foregoing packets can be stored at the wireless content switch 125 (action 528) in buffer 462. The beginning address that the data packets are transmitted is stored at buffer address indicator 465d.

Upon receipt of the acknowledgment signal 525 with a zero window size, the content source 110 enters what is known as a persist mode (action 530). The persist mode is characterized by a period of no transmission for a predetermined amount of time. At the expiration of the predetermined amount of time, the content source 110 transmits a signal (signal 535) addressed to the wireless client 105 which polls the window size for the wireless client 105, known as a window probe. The window probe is received by the wireless content switch 125 via the wired network 115 and the upstream port 450*a* en route to the wireless client 105. Wherein the deteriorated wireless conditions persist, the window probe will not arrive at the wireless client 105.

Therefore, upon receipt of the window probe signal 535, the wireless content switch 125 transmits an acknowledgment (signal 540) via upstream port 450*a* to the content source 110. The acknowledgement acknowledges the same last data packet received in sequence by the wireless client 105 and also indicates a window size of zero if the link status is still not good.

The wireless content switch 125 continues to respond to message transmitted from the content source 110, e.g., signal 535, until the wireless content switch 125 detects an improvement in the wireless link to the wireless client 105. When the wireless link at the wireless client 105 improves, the wireless client 105 transmits an acknowledgement signal of the window probe (signal 545) to the SGSN 310. The signal 540 is received by the wireless content switch 125 via the probe connected to downstream port 450*b*. Response to receipt of the foregoing signal, the wireless content switch 125 detects that the wireless link at the wireless client 105 has improved (action 550).

Upon detection that the wireless link at the wireless client 105 has improved, the wireless content switch 125 transmits any data packets that were cached at the wireless content switch 125 in the buffer 462 (signals 555). The address of buffer 462 where the data packets are stored is determined by retrieving buffer address indicator 465*d* of the record 465 associated with the wireless client 105. Transmission of the data packets to the wireless client 105 results in acknowledgement signals (signals 560). The acknowledgement signals 560 will include a value for window size which indicates that the wireless client 105 is ready to receive data packets at a particular data rate. The acknowledgement of the last stored data packet is forwarded via upstream port 450*a* to the content source 110.

Upon receipt of the foregoing acknowledgement 560, the content source 110 exits the persist state and resumes transmission data packets. Because the acknowledgement signal 560 acknowledges the last data packet transmitted by the content source 110 prior to deterioration of the wireless link, the content source 110 resumes with the data packet coming immediately, thereafter (signal 565). Additionally, the content source 110 resumes data packet transmission at the rate prescribed in signal 560, e.g., the minimum of the receiving window size and the congestion window size.

By using the flow control before expiration of the RTO timer expiration, a number of advantages are achieved. Window size reduction is used in a manner that allows fast resumption of the transmission when the link improves. Additionally, lost packets are avoided resulting in significant reduction of packet retransmission and Internet traffic. Additionally, as GPRS channels are provided on an on-demand basis, by avoiding transmission of data packets to an wireless client having a wireless link problem, the GPRS channel can be used by other wireless clients, thereby improving the throughput of the system.

Although the foregoing detailed description describes certain embodiments with a degree of specificity, it should be noted that the foregoing embodiments are by way of example, and are subject to modifications, substitutions, or alterations without departing from the spirit or scope of the invention. For example, although the embodiments are shown for deployment in a GPRS network, other embodiments can be displayed in a variety of other networks, such as 2.5G, 3G, UMTS, or CDMA 2000 wireless networks. Accordingly, the invention is only limited by the following claims, and equivalents, thereof.

What is claimed is:

1. A method for transmitting data packets from a content source to a wireless client, said method comprising:

detecting deteriorating wireless link conditions at the wireless client;

preventing a timer associated with data packets from timing out, responsive to detecting deteriorating wireless link conditions;

detecting improved wireless link conditions at the wireless client;

storing data packets addressed to the wireless client after detecting deterioration of the wireless link and until detection of improvement in the wireless link; and storing a wireless client table, wherein said wireless client table comprises a plurality of records associated with a corresponding plurality of wireless clients, wherein a plurality of wireless clients comprise said wireless client, wherein at least one of said plurality of records further comprises:

a packet number indicator for storing a packet number associated with a packet acknowledged by the wireless client associated with the record; and a wireless link indicator for indicating the condition of the wireless link at the wireless client associated with the record.

2. The method of claim 1, wherein detecting deteriorating wireless link conditions further comprises:

receiving a message transmitted between a base station system and a node.

3. The method of claim 2, wherein receiving a message transmitted between a base station system and a node comprises:

receiving a radio status message.

4. The method of claim 1, wherein preventing the timer associated with the data packets from expiring further comprises:

transmitting a message to the content source, said message acknowledging receipt of a data packet received at the wireless client, wherein the data packet was received prior to detection of deteriorating wireless link conditions.

5. The method of claim 1, wherein detecting improved wireless link conditions at the wireless client further comprises:

receiving a message transmitted between a base station and a node.

6. The method of claim 1, wherein preventing a timer associated with data packets from expiring further comprises:

responding to at least one message transmitted from the content source prior to detection of improved wireless link conditions.

7. The method of claim 6, wherein responding to at lease one message transmitted from the content source prior to detection of improved wireless link conditions further comprises;

responding to a window probe transmitted from the content source.

8. The method of claim 7, wherein responding to the window probe transmitted from the content source further comprises:

transmitting a message to the content source, said message acknowledging the window probe and indicating a window size of zero.

9. A wireless content switch for transmitting data packets from a content source to a wireless client, said wireless content switch comprising:

a downstream port for receiving a signal indicating deteriorating wireless link conditions at the wireless client; and an upstream port transmitting a signal preventing a timer associated with data packets from timing out, responsive to receiving the signal indicating deteriorating wireless link conditions; and a memory for storing a wireless client table, the wireless client table comprising a plurality of records associated with a corresponding plurality of wireless clients, wherein a plurality of wireless clients comprise said wireless client, wherein at least one of the plurality of the records further comprises:

a packet number indicator for storing a packet number associated with a packet acknowledged by the wireless client associated with the record;

a wireless link indicator for indicating the condition of the wireless link at the wireless client associated with the record.

10. The wireless content switch of claim 9, wherein the downstream port receives a signal from a group consisting of a radio status message, a routing area update, and an identity request message.

11. The wireless content switch of claim 9, wherein the upstream port transmits an acknowledgment signal to the content source with a window size of zero.

12. The wireless content switch of claim 9, wherein the memory further comprises:

a buffer for storing a data packets for the plurality of wireless clients.

13. The wireless content switch of claim 12, wherein the record further comprises:

a buffer address indicator for storing an address to a memory location in the buffer wherein data packets for the wireless client associated with the record are stored.

* * * * *